United States Patent Office 3,657,355
Patented Apr. 18, 1972

3,657,355
PRODUCTION OF 2-NITROCHLOROBENZENES
Kurt H. G. Pilgram, Modesto, Calif., assignor to Shell
Oil Company, New York, N.Y.
No Drawing. Filed Oct. 9, 1970, Ser. No. 79,620
Int. Cl. C07c *149/34, 79/12*
U.S. Cl. 260—609 E          11 Claims

ABSTRACT OF THE DISCLOSURE 2-nitrochlorobenzenes are prepared by reacting certain 4-substituted 2-nitrophenols with phosgene in an inert solvent in the presence of a catalytic amount of a dialkylformamide, thus replacing the hydroxy group with chlorine.

BACKGROUND OF THE INVENTION

Description of prior art

U.S. 3,221,065 discloses the method of replacing a hydroxy group with a halogen in certain polynitrated phenyl compounds with thionyl chloride in the presence of a catalytic amount of a dialkylformamide and an inert solvent.

SUMMARY OF THE INVENTION

This invention is a method for replacing a hydroxy group with chlorine in certain 4-substituted 2-nitrophenols of the formula:

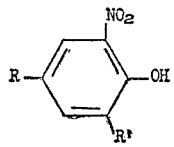

where R is nitro, lower alkyl or lower alkylthio, and R' is nitro, lower alkyl or hydrogen, which comprises reacting the 2-nitrophenol with phosgene in an inert solvent in the presence of a catalytic amount of a lower dialkylformamide.

This invention is especially valuable in the preparation of 4-(methylthio)-2,6-dinitrochlorobenzene, which is an intermediate useful in the preparation of 4-(methylsulfonyl)-2,6-dinitro-N,N-dipropylaniline, the active ingredient in PLANAVIN® Herbicide.

U.S. Pat. 3,211,065 teaches that 2,6-dinitrophenols which are substituted at the 4-position by a nitro group or a methyl group can be converted into the corresponding 2,6-dinitro-chlorophenyl compound by refluxing the phenol with thionyl chloride and catalytic amounts of dimethylformamide in an inert solvent. The reaction, however, takes much time to go to completion. For example, 28¾ hours of refluxing with thionyl chloride, carbon tetrachloride and dimethylformamide were required to obtain only an 81.7% yield of 4-methyl-2,6-dinitrochlorobenzene from 4-methyl-2,6-dinitrophenol.

Surprisingly, it has been found that if the thionyl chloride is replaced by phosgene in the same reaction, an 82% yield can be obtained in only 16 hours from the same compound. Further, it has been discovered that 4-(methylthio)-2,6-dinitrophenol can be converted to 4-(methylthio)-3,5-dinitrochlorobenzene by this method in over 90% yields in about 30 minutes.

U.S. Pat. 3,221,065 also discloses examples which illustrate the selective nature of the process described therein. Specifically, it is stated "Apparently one cannot predict in general that chlorine groups may be substituted for hydroxy groups in nitrated aromatic compounds." The examples presented attest that the process is not broadly applicable. The patent indicates that 4-methyl 2,6-dinitrophenol can be converted to the corresponding chloro-substituted compound by refluxing with thionyl chloride and catalytic amounts of dimethylformamide in carbon tetrachloride. The 2,4-dinitro-6-methylphenol, however, will not react under the same conditions. Also unreactive under the same conditions is 2-nitro-4-methylphenol. It is shown, however, that 2,4-dinitrophenol and 2,4,6-trinitrophenol can be relatively easily converted to the corresponding chloro-substituted compound.

Surprising, by the method of this invention all of the foregoing phenols can be converted to the corresponding chloro-substituted compounds. Furthermore, 2-nitro- and 2,6-dinitrophenols which are substituted at the 4-position by an alkylthio group can also be converted to the corresponding chloro aromatic compounds. That these reactions occur is very surprising in view of the teaching of U.S. 3,221,065 and the similarity between the thionyl chloride and phosgene.

PREFERRED EMBODIMENTS OF THE INVENTION 4-substituted 2-nitrophenols which can be reacted according to the process of this invention are described by the following formula:

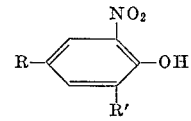

where R is nitro, lower alkyl or lower alkylthio, and R' is nitro, lower alkyl or hydrogen. Lower alkyl is an alkyl containing from 1 to 4 carbon atoms, such as methyl, ethyl, propyl, butyl or any of the isomers thereof. Lower alkylthio is an alkylthio group containing from 1 to 4 carbon atoms of the structure RS, wherein the R is methyl, ethyl, propyl or butyl or any of the isomers thereof. Thus, compounds that fall into this category include the following: 4-methyl-2,6-dinitrophenol, 6-methyl-2,4-dinitrophenol, 4-methyl - 2 - nitrophenol, 2,4 - dinitrophenol, 2,4,6-trinitrophenol, 4-ethyl-2,6-dinitrophenol, 4-propyl-2,6-dinitrophenol, 4 - butyl - 2,6 - dinitrophenol, 4-methyl-2,6-dinitrophenol, 4-ethylthio-2,6-dinitrophenol, 4-propylthio-2,6-dinitrophenol and the like. Of these compounds, the 4-alkylthio-2,6-dinitrophenols are preferred. Especially preferred is 4-methylthio-2,6-dinitrophenol.

The inert solvents which can be used according to the process of this invention include inert aromatic or substituted aromatic compounds of from 1 to 10 carbons and chlorinated lower aliphatic hydrocarbons of from 1 to 4 carbons which exhibit reasonable reflux ranges. The aromatic or substituted aromatic compounds include benzene, toluene, and the like. Chlorinated lower aliphatic hydrocarbons include methylene chloride, chloroform, carbon tetrachloride, 1,1,1-trichloroethane and the like. Preferred are the polychlorinated methanes such as chloroform, methylene chloride and carbon tetrachloride. Especially preferred is carbon tetrachloride.

The mole ratio of solvent to reactant will be greater than 1:1 and may be as high as 50:1 or more. It is preferred to use enough solvent to either dissolve the phenol or form an easily stirrable slurry. The preferred mole ratio is between about 10:1 to 40:1.

The catalyst used is a lower N,N-dialkylformamide, wherein each alkyl contains from 1 to 4 carbon atoms, preferably N,N-dimethylformamide. Although the amount of the catalyst used is not critical, it is necessary that at least a catalytic quantity is present. From about 5 to 25 percent by weight (% w.) of dimethylformamide, based upon weight of the phenol present, is found to give useful yields. Additional catalyst can be used but no particular advantage is gained therefrom.

Conversion of the phenol to the corresponding chlorophenyl compound will occur if either reactant is present in excess. However, to push the reaction to completion it is preferred to have at least equimolar quantities of the phenol and the phosgene (mole ratio of phosgene:phenol of 1:1). The mole ratio of phosgene to the phenol may be as high as 2:1 or more but no particular advantage results therefrom. Particularly preferred is the mole ratio range between about 1.1:1 to 1.5:1.

The phosgene may be dissolved in the inert solvent and the phenol added thereto or the phenol may be mixed with the inert solvent and the phosgene added to that mixture. However, for handling considerations it is usually easier to dissolve or suspend the phenol in the solvent and add the phosgene thereto.

The temperature at which the reaction is carried out may vary from about 40° to 120° C. It is preferred that the reaction be carried out at reflux conditions and these will be in part dependent upon the solvent and reactant which are used in any particular situation.

The reactions can be carried out at atmospheric or superatmospheric pressure.

The time which will be required for the reaction to go to completion may be from several minutes to about 30 hours. However, the usual time required for the reaction to go to completion will be about 15 minutes to about 20 hours.

PREPARATION

The following examples serve to demonstrate the process of this invention.

EXAMPLE I

Preparation of 4-(methylthio)-2,6-dinitrochlorobenzene

A 3-neck, round bottom 500 milliliter (ml.) flask was equipped with a mechanical stirrer, a thermometer and a reflux condenser, which, in turn, was topped by a Dry Ice-acetone condenser. Six grams (g.) of phosgene was bubbled into a slurry of 11.5 g. of 4-methylthio-2,6-dinitrophenol, 2 ml. dimethylformamide and 150 ml. of carbon tetrachloride. This mixture was stirred and heated at reflux temperature for about 30 minutes. Analysis of the resulting clear solution by thin-layer chramatography indicated quantitative conversion to 4-(methylthio)-2,6-dinitrochlorobenzene. The carbon tetrachloride and excess phosgene was removed by distillation and the residual yellow solid was dissolved in hot ethanol. The resulting solution was diluted with water to drop out the product which was then filtered and dried. This yielded 12.1 g. of the desired product which gave the following:

*Elemental analysis.*—Calculated (percent): Cl, 14.3; N, 11.3. Found (percent): Cl, 14.2; N, 11.2.

EXAMPLE II

Preparation of 4-methyl-2,6-dinitrochlorobenzene

Using the same equipment and procedure as in Example I, 19.8 g. of 2,6-dinitro-p-cresol, 2 ml. of dimethylformamide, 250 ml. of carbon tetrachloride and 15.0 g. of phosgene were charged to the flask. The mixture was refluxed for 16 hours, filtered and evaporated to dryness. The residue was dissolved in ethanol and recrystallized therefrom to give 18.0 g. of a substance which melted at 110–111° C. and was confirmed by infrared analysis to be 4-methyl-2,6-dinitrochlorobenzene.

*Elemental analysis.*—Calculated (percent): Cl, 16.4; N, 12.9. Found (percent): Cl, 16.1; N, 13.1.

EXAMPLE III

Preparation of 2-methyl-4,6-dinitrochlorobenzene

Using the same equipment and procedure as in Example I, 9.9 g. of 2-methyl-4,6-dinitrophenol, 200 ml. of carbon tetrachloride, several drops of dimethylformamide and 6.0 g. of phosgene were charged to the flask and refluxed for 11 hours. The resulting mixture was filtered and evaporated almost to dryness. The residue was dissolved in methanol and recrystallized therefrom to yield 8.4 g. of a product which melted at 59°–61° C. and which was confirmed by infrared analysis to be 2-methyl-4,6-dinitrochlorobenzene.

*Elemental analysis.*—Calculated (percent): Cl, 16.4; N, 12.9. Found (percent): Cl, 16.2; N, 12.7.

EXAMPLE IV 2,4-dinitrochlorobenzene

Using the same equipment and procedure as in Example I, 18.4 g. of 2,4-dinitrophenol, 200 ml. of carbon tetrachloride, 2 ml. of dimethylformamide and 15.0 g. of phosgene were charged to the flask and refluxed for 2 hours. The resulting mixture was filtered while still hot and then evaporated to dryness. The residue was washed with hexane and dried to yield 15.4 g. of a product which melted at 44°–46° C. and which was confirmed to be 2,4-dinitrochlorobenzene by infrared and nuclear magnetic resonance analysis.

*Elemental analysis.*—Calculated (percent): Cl, 17.5; N, 13.8. Found (percent): Cl, 17.4; N, 13.7.

I claim as my invention:

1. A process for replacing a hydroxy group with chlorine in certain 4-substituted 2-nitrophenols of the formula:

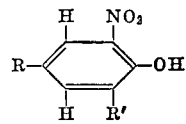

wherein R is nitro, alkyl of from 1 to 4 carbon atoms, or alkylthio of from 1 to 4 carbon atoms and R' is nitro, alkyl of from 1 to 4 carbon atoms or hydrogen, which comprises reacting the nitrophenol with phosgene in an inert solvent in the presence of a catalytic amount of a lower dialkylformamide.

2. The process according to claim 1 wherein the lower dialkylformamide is dimethylformamide.

3. The process according to claim 2 wherein the dimethylformamide is present in a catalytic amount but essentially not more than about 25 percent by weight of the 4-substituted 2-nitrophenol compound.

4. The process according to claim 1 wherein the reaction takes place at reflux temperature.

5. The process according to claim 1 wherein the inert solvent is a chlorinated lower aliphatic hydrocarbon.

6. The process according to claim 5 wherein the chlorinated lower aliphatic hydrocarbon is a polychlorinated methane.

7. The process according to claim 6 wherein the polychlorinated methane is carbon tetrachloride.

8. The process according to claim 1 wherein the inert solvent is present in molar excess of the 4-substituted 2-nitrophenol but less than 50 times the molar quantity of the 4-substituted 2-nitrophenol.

9. The process according to claim 1 wherein R is lower alkylthio and R' is nitro.

10. The process according to claim 9 wherein R is methylthio.

11. The process according to claim 1 wherein the phosgene is present in at least a molar amount equal to the 4-substituted 2-nitrophenol but less than twice the number of moles of the 4-substituted 2-nitrophenol.

References Cited

Saunders et al.: Chem. Abs., vol. 46, p. 1985 (1952).
Cotter et al.: Chem. Abs., vol. 63, p. 5556 (1965).

LELAND A. SEBASTIAN, Primary Examiner

U.S. Cl. X.R.

71——103; 260—646